Patented Dec. 27, 1927.

1,654,167

UNITED STATES PATENT OFFICE.

WILLIS A. GIBBONS, OF LITTLE NECK, NEW YORK, ASSIGNOR TO THE NAUGATUCK CHEMICAL COMPANY, OF NAUGATUCK, CONNECTICUT, A CORPORATION OF CONNECTICUT.

PROCESS FOR VULCANIZING RUBBER.

No Drawing.  Application filed December 17, 1923. Serial No. 681,079.

This invention relates to process for vulcanizing rubber and particularly to processes where the vulcanizing ingredient or agent is combined with the latex.

Where latex is to be employed after the lapse of considerable time from collection it is usually customary to add up to 3% of an alkali material such as ammonia or a quantity of some other preservative such as formaldehyde in order to stabilize it and preserve it in uncoagulated condition. In this condition it usually appears in those markets which are remote from the rubber plantations and is there purchased by consumers who employ it in manufacturing processes ordinarily including its coagulation or desiccation with subsequent vulcanization. It is not practicable to employ all of the vulcanizing agents and ingredients ordinarily used with crude rubber, for addition to such alkali-treated-latex, since ammonia and similar alkali tend to decompose some of these materials with consequent loss in their vulcanizing power. Also some vulcanizing ingredients tend to cause coagulation of the latex.

The principal object of the present invention accordingly is to provide a simple, efficient process for preparing a stable latex composition for vulcanization comprising a vulcanizing accelerator.

The invention accordingly comprises a process for preparing, drying and vulcanizing a latex composition which includes combining with latex, containing an alkali preservative, a high-powered organic accelerator, stable toward the preservative and which does not coagulate the latex. It also includes products of such process.

The expression "high powered organic accelerator" as used herein is intended to designate an organic accelerator which when employed with rubber for acceleration of vulcanization is able to accomplish satisfactory vulcanization in a relatively short time or at relatively low temperatures or both. For example 2 parts or less of a high powered accelerator when mixed with 100 parts of pale crepe rubber, 10 parts of zinc oxide, 3 parts of sulphur and vulcanized under 40 lbs. steam presure for 60 minutes will yield a vulcanizate having a tensile strength greater than 2000 lbs. per square inch.

In carrying out the invention in its preferred form 100 parts of rubber (employed in the form of latex containing 2% ammonia and having approximately 35% solid content) is combined with 1 part of zinc dimethyldithiocarbamate—

$$((CH_3)_2NCS_2)_2Zn—$$

1 part of zinc oxide and 3 parts of precipitated sulphur. The zinc dimethyldithiocarbamate, zinc oxide and sulphur are mixed to a thin paste with dilute ammonium hydroxide. The paste is then added slowly with constant stirring of the latex. Upon drying and heating the resulting composition to 212° F. for 40 minutes vulcanization is accomplished. The stability of the composition formed as above is influenced by the quantity of zinc oxide present. The lower the amount of zinc oxide the less the tendency to coagulate. Instead of employing latex containing 35% solid material higher and lower concentrations have been satisfactorily employed. Instead of desiccation of the composition, coagulation may be carried out and in case the coagulant used such as acetic acid dissolves the zinc oxide or other ingredient ordinarily more of this ingredient is preferably employed in the composition, or zinc acetate may be employed.

*Example 2.*—100 parts of rubber (employed in the form of latex containing 2% ammonia and having approximately 35% solid content) is combined with 1 part of tetramethylthiuramdisulphide, 2 parts of zinc oxide and 3 parts of sulphur. The tetramethylthiuramdisulphide, zinc oxide and sulphur are mixed to form a paste with dilute ammonium hydroxide and added as before to the latex. Upon drying and heating the resulting composition to 212° F. for 40 minutes vulcanization is accomplished. It appears that the vulcanizing ingredients react while in the latex, the resulting composition consisting of latex, zinc dimethyldithiocarbamate, zinc oxide and sulphur.

The remarks made concerning the stability and coagulation given in Example 1 also apply to the composition of the present example.

*Example 3.*—The following composition is made up: 100 parts of rubber (employed in the form of latex containing 2% ammonia and having approximately 35% solid content), 25 parts of zinc oxide, 60 parts of sulphur, 5 parts of tetramethylthiuramdisulphide and 5 parts of glue. The zinc oxide, sulphur, tetramethylthiuramdisulphide and glue are combined with dilute ammonia to form a thin paste and this is gradually stirred into the latex as heretofore. This mixture may be sprayed to give a smooth film to serve as a protective and decorative coating for example on wood, metal and other materials. Upon being maintained for 14 hrs. at 265° F. a hard film is obtained which resists the action of acids other than strong nitric and sulphuric acid and of organic solvents.

*Example 4.*—The following composition is prepared: 100 parts of rubber (employed in the form of latex containing 2% ammonia and having approximately 35% solid content), is combined with 1 part of tetramethylthiurammonosulphide, 2 parts of zinc oxide and 3 parts of sulphur. The tetramethylthiurammonosulphide, zinc oxide and sulphur are mixed to form a paste with dilute ammonium hydroxide and added as before to the latex. Upon drying and heating the resulting composition to 212° F. for 40 minutes vulcanization is accomplished. It appears that the vulcanizing ingredients react while in the latex, the resulting composition consisting of latex, zinc dimethyldithiocarbamate, zinc oxide and sulphur. The remarks made concerning the stability and coagulation given in Example 1 also apply to the composition of the present example.

The materials zinc dimethyldithiocarbamate, tetramethylthiuramdisulphide and tetramethylthiurammonosulphide are representatives of three classes of high-powered nitrogenous accelerators which fall under the general group NCSM where M represents a salt forming element or group such as zinc, ammonium, etc. or hydrogen or a radical SCR or CR.

Compositions formed in accordance with the above examples are relatively stable. They may be employed for treatment of cords, for the preparation of weftless fabric and for other treatments of fibrous materials. They may be employed for dipping, modeling, molding, etc.

It will be observed in accordance with the examples that the time and temperature employed for vulcanization is about the same as that ordinarily employed when crude rubber is used showing that the presence of ammonia has been substantially without deleterious effect on the vulcanizing action of the resulting composition. Furthermore, the vulcanizing ingredients do not cause the latex to coagulate.

As many apparently widely different embodiments of this invention may be made without departing from the spirit thereof it will be understood that I do not intend to limit myself to the specific embodiments herein set forth except as indicated in the appended claim.

Having thus described my invention, what I claim and desire to protect by Letters Patent is:

Process of manufacturing vulcanized rubber compositions which comprises the drying and vulcanization of substantially uncoagulated rubber latex containing an organic accelerator capable of effecting vulcanization at temperatures below those ordinarily employed in hot vulcanization methods.

Signed at New York, county of New York, and State of New York, this 10th day of December, 1923.

WILLIS A. GIBBONS.